United States Patent [19]

Mody

[11] Patent Number: 4,905,031
[45] Date of Patent: Feb. 27, 1990

[54] AXIAL MAGNETIC ACTUATOR

[75] Inventor: Hemant K. Mody, Rochester, N.Y.

[73] Assignee: Eastman Kodak Company, Rochester, N.Y.

[21] Appl. No.: 334,774

[22] Filed: Apr. 10, 1989

Related U.S. Application Data

[63] Continuation of Ser. No. 132,732, Dec. 14, 1987, abandoned.

[51] Int. Cl.⁴ .......................... G03B 3/10; G02B 7/02; H01H 47/04
[52] U.S. Cl. ................................ 354/195.1; 350/255; 361/147
[58] Field of Search ................... 361/147; 350/255; 354/195.1

[56] References Cited

U.S. PATENT DOCUMENTS

| | | | |
|---|---|---|---|
| 3,634,735 | 1/1972 | Komatsu | 361/147 X |
| 4,720,185 | 1/1988 | Kurihara | 350/255 |

Primary Examiner—Michael L. Gellner
Attorney, Agent, or Firm—Donald D. Schaper

[57] ABSTRACT

An axial magnet actuator is disclosed in which a member formed of a magnetic material is movable relative to a frame along an axis. Electromagnets are positioned along the axis at spaced locations. In order to keep the mass of the movable member as small as possible, no magnetic elements are located on the member. An annular permanent magnet is located along the axis between the electromagnets and functions with the electromagnets to move the member, keep the member suspended in an axial direction, and hold the member in a selected position when the electromagnets are not energized.

3 Claims, 5 Drawing Sheets

AXIAL MAGNETIC ACTUATOR

This is a continuation of application Ser. No. 132,732 filed Dec. 14, 1987, now abandoned.

CROSS REFERENCE TO RELATED APPLICATIONS

Reference is made to commonly-assigned U.S. patent application, Ser. No. 132,731, entitled Magnetic Actuator, filed in the name of Hemant K. Mody on even date herewith, and to commonly-assigned U.S. patent application, Ser. No. 132,744, entitled Exposure Control Device, filed in the name of Hemant K. Mody on even date herewith.

BACKGROUND OF THE INVENTION

1. Field of the Invention

The present invention relates to an axial magnetic actuator, and more particularly, to such an actuator which is particularly suitable for use in precision applications such as a camera focus actuator.

2. State of the Prior Art

Magnetic actuators are known for moving elements in various types of mechanisms. In certain of these mechanisms, it is desirable for the movable element to be as light as possible, to move silently, and with a minimum of friction. One of the problems in magnetic actuators of a bidirectional type is that a magnetic element, such as a coil or a permanent magnet, must be incorporated in the movable element; this increases the mass of the element and hence the power requirements of the actuator.

In U.S. Pat. No. 4,051,499, there is disclosed a focal plane shutter having leading and trailing blinds made of opaque plastic sheet material. A thin permanent magnet is sealed in each of the blinds. A series of electromagnetic coils are located along the path of each blind, and the coils are sequentially energized to drive the blinds in accordance with the principle of a linear motor. Such an arrangement has the disadvantage that complex drive electronics are required to regulate the current in the series of electromagnetic coils. It also has the disadvantage noted above, that is, the movable elements have a relatively high mass as a result of the magnets being incorporated in the blinds.

SUMMARY OF THE INVENTION

It is an object of the invention to overcome the problems in the prior art and to provide a magnetic actuator which has improved operating characteristics.

In accordance with one aspect of the present invention, there is provided an axial magnetic actuator for providing a driving force along an axis, the actuator comprising: a member disposed along said axis and having at least a portion thereof formed of a magnetic material; magnetic means disposed around the axis for forming a magnetic circuit adjacent the portion, the relative positions of said magnetic means and said member being maintained by said circuit; and means for creating an imbalance in the circuit to effect relative movement between the member and the magnetic means.

In accordance with another aspect of the present invention, there is provided an axial magnetic actuator for positioning a lens along an optical axis, the actuator comprising: a member which includes a lens and a lens mount, the lens mount having a portion formed of a magnetic material; magnetic means disposed around the axis for forming a magnetic circuit adjacent the portion, the relative positions of the magnetic means and the member being maintained by the circuit; and means for creating an imbalance in the circuit to effect relative movement between the member and the magnetic means.

In one embodiment of the present invention, a member formed of a magnetic material is adapted to be moved along a predetermined path between two locations. An electromagnet is disposed adjacent each of the locations. An annular permanent magnet is disposed between the electromagnets and is radially magnetized. The electromagnets are selectively energized to move the member between the two locations.

An advantage of the present invention is that the magnetic circuit incorporates the permanent magnet in a manner to provide two features: (1) magnetic suspension in the direction of movement of the member; and (2) a magnetic energy minimum at a position intermediate the two extreme positions of movement. The first feature in combination with the low mass of the member make the power requirements of the actuator quite low. The second feature ensures a monostable member, that is, no current is required to maintain the member in a rest position. Other advantages of the invention are: dynamic braking is not required; low-peak power is required to drive the actuator; and the actuator can be driven with a very simple drive waveform.

An advantage of the focus actuator disclosed herein is that direct linear motion can be imparted to the lens, whereas in known devices a rotary driver is used and the rotary motion of the driver must be converted to linear motion.

Other features and advantages will become apparent with reference to the following Description of the Preferred Embodiment when read in light of the attached drawings.

DESCRIPTION OF PREFERRED EMBODIMENTS

Figure 1:
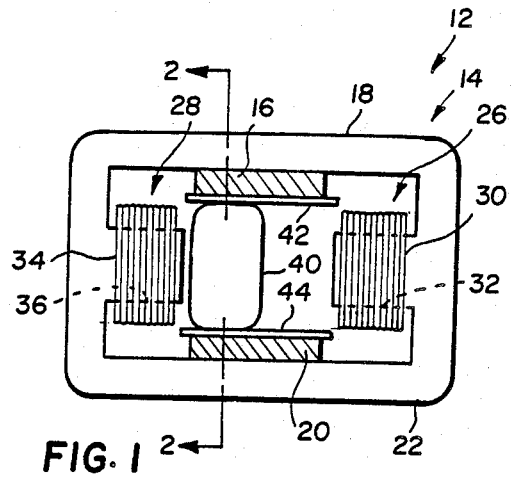
FIG. 1 is an front elevational view of a magnetic actuator.

Although the present invention is directed to an axial magnetic actuator, certain principles of the invention will be explained by reference to a magnetic actuator 12 shown in FIG. 1 and disclosed and claimed in the aforesaid U.S. patent application Ser. No. 132,731, for a Magnetic Actuator. Actuator 12 comprises a frame 14, a permanent magnet 16 fixed to a top frame member 18, and a permanent magnet 20 fixed to a bottom frame member 22. Electromagnets 26 and 28 are disposed at opposite sides of shutter 12, as viewed in FIG. 1. Electromagnet 26 includes a coil 30 and a core 32 which is integral with 14, and electromagnet 28 includes a coil 34 and a core 36 which is also integral with frame 14. A member 40 is movable on tracks 42 and 44 between a first position adjacent coil 34, shown in FIG. 1, and a second position adjacent coil 30. Frame 14 and member 40 can be made from any magnetizable material, for example, silicon steel, permalloy, or mu metal. The frame 14 provides a low reluctance path for the flux from permanent magnets 16 and 20 and electromagnets 26 and 28, and frame 14 also serves to define the air gap between member 40 and electromagnets 26 and 28.

Figure 3:
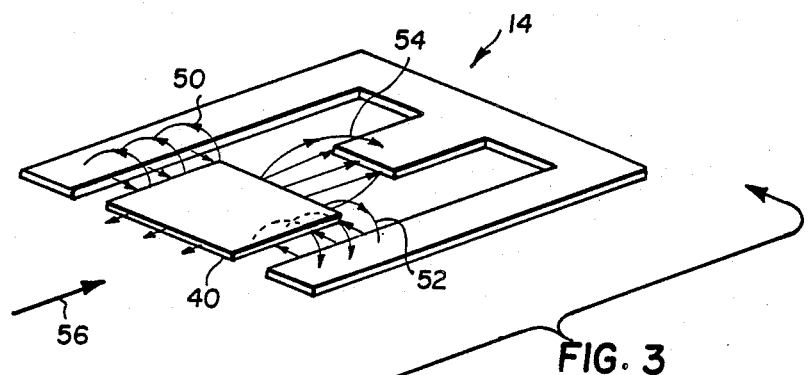
FIG. 3 is a perspective view of the frame of the actuator showing lines of force from the permanent magnets.

The two permanent magnets 16 and 20 produce magnetic fields which combine to form a magnetic circuit in which member 40 operates. In FIG. 3, lines 50 and 52 indicate, schematically, the direction of lines of force of permanent magnets 16 and 20, respectively, and lines 54 indicate, schematically, the direction of lines of force produced by the combined effect of magnets 16 and 20. The lines of force indicated by lines 54 tend to move member 40 in the direction of arrow 56 and along an X axis as shown in diagram 49. As shown in FIG. 3, the magnetic fields of permanent magnets 16 and 20 tend to oppose each other; this causes the flux leaving magnets 16 and 20 along the Y axis to gradually bend in the direction of the X axis. Thus, if member 40 is closer to, for example, electromagnet 26, the flux leaving the edge of member 40 closer to electromagnet 26 is greater than that leaving the edge of member 40 facing electromagnet 28. This causes a magnetic energy differential which renders the member 40 bistable along the X axis, that is, along the path of movement.

The motion of member 40 is effected by energizing coils 30 and 34 in a manner such as to buck and boost the magnetic field at the trailing and leading edges, respectively, of the member 40. The direction of motion is determined by the direction of current in coils 30 and 34. Thus, assuming that member 40 is resting adjacent coil 30 at the start of operation, coils 30 and 34 are energized so that the flux emanating from the side of member 40 adjacent coil 30 is bucked and the flux on the side of member 40 nearest coil 34 is enhanced; this causes member 40 to move toward coil 34. Reversing the current direction in coils 30 and 34 causes the member 40 to move in the opposite direction. Thus, it will be seen that electromagnets 26 and 28 serve as a means for creating an imbalance in the magnetic circuit to effect the movement of member 40. Although coils 30 and 34 are shown as separate elements, the coils could be formed from one continuous conductor since they are both energized with current of the same polarity.

Figure 6A:
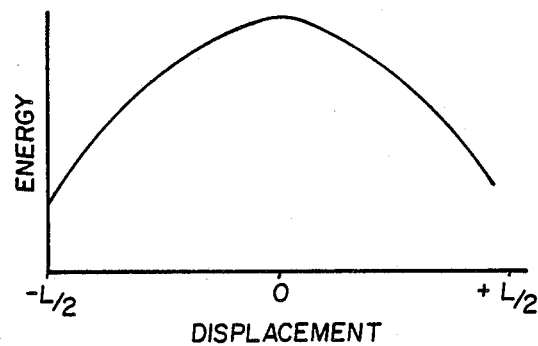
FIG. 6A is a plot of stored energy versus displacement of the member when the electromagnets are deenergized and one permanent magnet is polarized in a direction opposite to the other permanent magnet.
Figure 7:
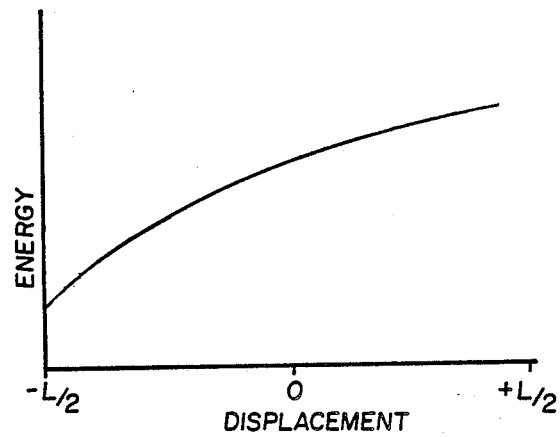
FIG. 7 is a plot of stored energy versus displacement of the member when the electromagnets are energized to move the member to the left.

In FIG. 6A, there is shown a representation of the stored energy in the magnetic circuit when coils 30 and 34 are not energized. The total displacement of member 40 along its path of travel is considered to be L, with 0 designating a midpoint in the path of travel, $-L/2$ designating a position at one end of the path, and $L/2$ designating a position at the opposite end of the path. Member 40 moves to the position of least energy which is at either end of the curve, that is, at position $-L/2$ or $L/2$. To effect movement of member 40, for example, from position $L/2$ to $-L/2$, coils 30 and 34 are energized which produces stored energy in the circuit as shown by the curve in FIG. 7. The current in coils 30 and 34 is reversed to effect movement of member 40 from $-L/2$ to $L/2$; in this case, the stored energy curve (not shown) would be the reverse of the curve shown in FIG. 7, that is, high energy at $-L/2$ and low energy at $L/2$.

The force on the member 40 due to the permanent magnets 16 and 20 increases rapidly as the air gap between member 40 and one of the electromagnets 26, 28, decreases. At the end of the stroke of member 40, the force on the member 40 can be large enough to prevent a noticeable bounce. As a result of this force, no dynamic braking is required in actuator 12. In many prior-art actuators, it is necessary to provide dynamic braking by, for example, reversing the current near the end of the stroke, in order to prevent bounce of a movable member. The force on member 40 due to magnets 16 and 20 also has the effect of reducing the power requirements of the electromagnets 26 and 28. In one representative example, magnets 16 and 20 are selected such that each magnet 16, 20, produces a force equivalent to the force produced by one of the electromagnets 26, 28, and thus, the power requirements are reduced by one-half.

Figure 6B:
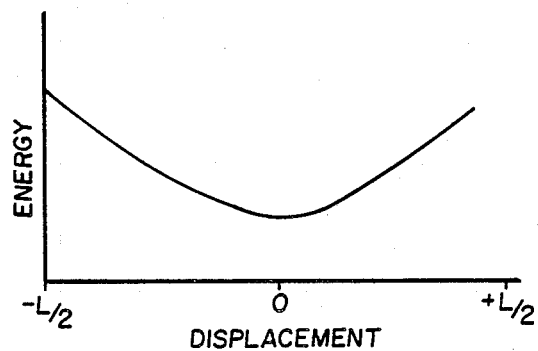
FIG. 6B is a plot of stored energy versus displacement of the member when the electromagnets are deenergized and both permanent magnets are polarized in the same direction.

The effect of having magnetic energy minima at the end of the stroke of member 40, as shown in FIG. 6A, ensures a bistable member, that is, no current is required to maintain the member in either of the two positions $-L/2$, $L/2$. It is also possible for member 40 to be monostable, that is, to be maintained in a single position by permanent magnets 16 and 20, for example, in a position intermediate the two electromagnets 26 and 28. In this case, permanent magnets 16 and 20 would be polarized in the same direction, and the resulting energy distribution from the two permanent magnets 16 and 20 would be as shown in FIG. 6B. As shown in FIG. 6B, member 40 would be maintained at the 0 position. Other examples of monostable elements are disclosed in the embodiments of the present invention shown in FIGS. 9-12 and discussed hereinafter.

Figure 4:
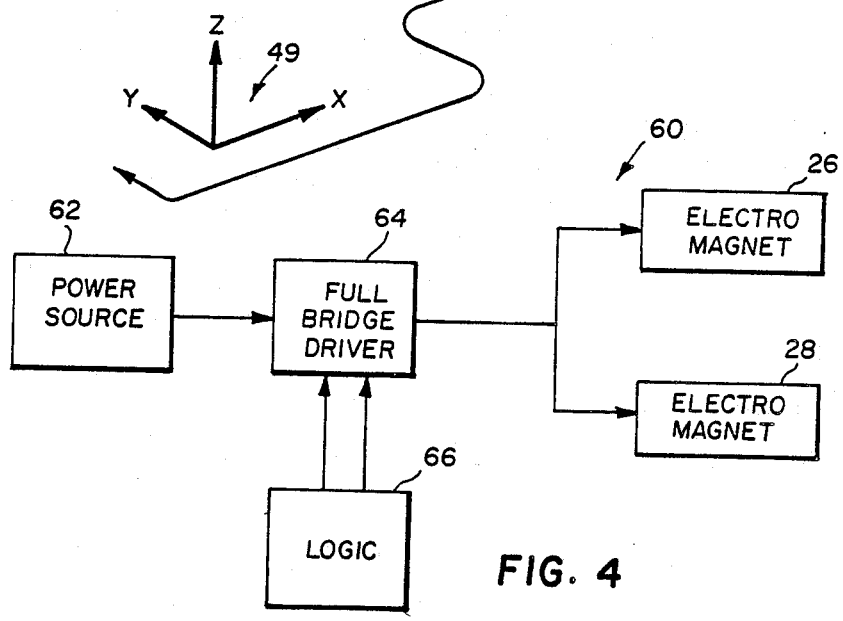
FIG. 4 is a block diagram of the driver for the actuator shown in FIG. 1.

Current is supplied to coils 30 and 34 by means of a driver 60 (FIG. 4) which includes a power source 62, a full bridge driver 64, and logic module 66. Full bridge driver 64 can be, for example, a Model JDN 1953B, obtainable from the Sprague Co., and the logic module 66 can include a dual single shot (not shown) which can be a Model 96LS02, obtainable from the Fairchild Co. In certain applications, actuator 12 is driven by current pulses, and the speed of actuator 12 can be regulated by changing the delay between pulses.

Figure 5:
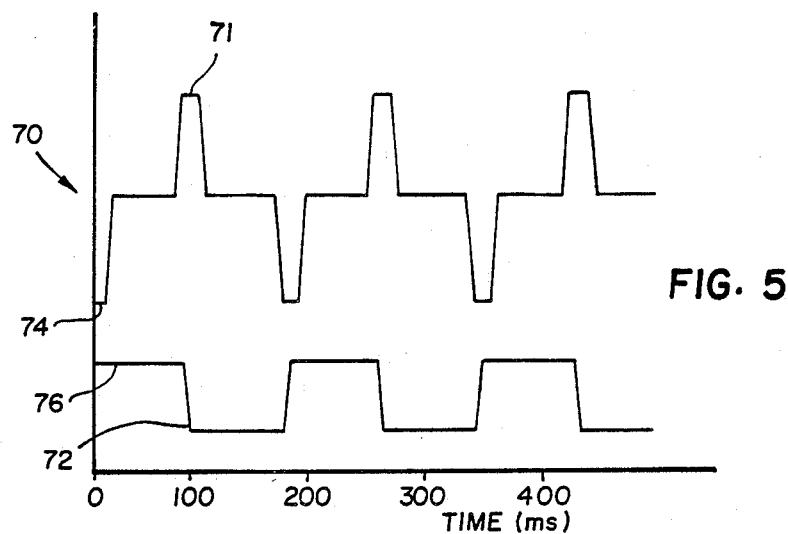
FIG. 5 is a graphical representation showing the timing of the movable member in relation to the timing of the drive pulses.

With reference to FIG. 5, there are shown a waveform 70 which represents input pulses to actuator 12 and a waveform 73 which illustrates movement of member 40 in response to the pulses in waveform 70. Positive current pulses 71 are provided by driver 60 in actuator 12 to move member 40 to a first position, indicated by lines 72, and negative current pulses 74 are provided by driver 60 to move member 40 to a second postion, indicated by lines 76. Actuator 12 can be operated to move member 40 between the two positions in less than 5 milliseconds.

Figures 8A, 8B, 8C:
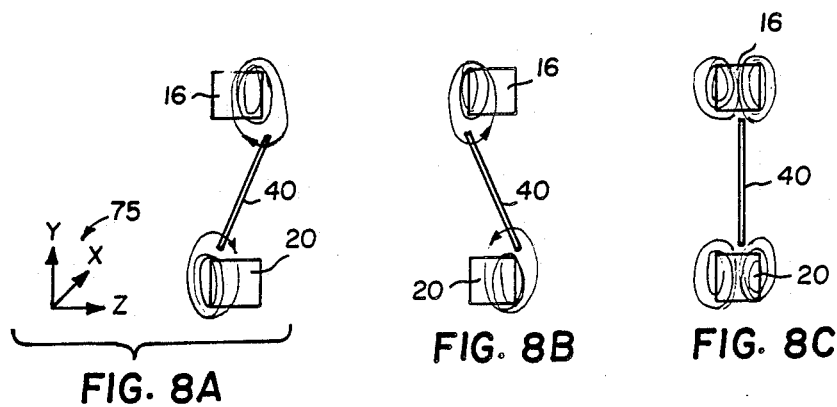
FIGS. 8A–8C are illustrations of the magnetic forces which suspend the member along the Z axis.

As noted above, the magnetic circuit in actuator 12 incorporates permanent magnets 16 and 18 in a manner to provide a magnetic energy minimum at the rest position of member 40. The magnetic circuit also provides magnetic suspension along one degree of freedom which is, in the case of actuator 12, in a direction normal to the plane of member 40. As a result of the combined effects of the magnetic suspension of member 40 and the low mass of member 40, a minimum of power is required by the electromagnets 26 and 28. In FIGS. 8A–8C, there are shown the magnetic forces from magnets 16 and 20 which support member 40 along the Z axis as defined by diagram 75, that is, in a direction transverse to the path of movement of member 40 and to the plane of member 40. The equilibrium position of member 40 is shown in FIG. 8C. Any tendency of the member 40 to move from the equilibrium position of FIG. 8C will be resisted by the magnetic flux generated by magnets 16 and 20, as shown schematically in FIGS. 8A and 8B, and the member 40 will be maintained in an equilibrium position.

Figure 2:
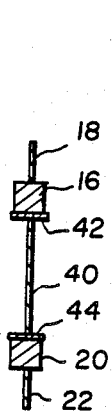
FIG. 2 is a sectional view, taken along the line 2—2 in FIG. 1.

In one representative example of actuator 12, frame 14 is formed from silicon steel, the outside dimensions of frame 14 are approximately 6.096 cm by 3.556 cm, and the thickness of the frame is about 0.018 cm. Permanent magnets 16 and 20 are square in cross section, as viewed in FIG. 2, and each side is approximately 0.3175 cm; the length of magnets 16 and 20 is about 2.286 cm, as viewed in FIG. 1. The material of the permanent magnets 16 and 20 is Ceramic 8, obtainable from the Hitachi Magnets Corp. Each of the coils 30, 34, is formed from 32 AWG copper wire and has approximately 450 windings. Member 40 is formed from silicon steel, the outside dimensions are approximately 1.778 cm by 1.27 cm, as viewed in FIG. 1, the thickness is about 0.0051 cm, and the mass is about 0.087 grams. An actuator of the type described in this example has been used successfully as a shutter in an electronic camera in which the member 40 is driven to open and close the shutter ten times per seconds by current pulses of approximately 0.36 amperes.

Figure 9:
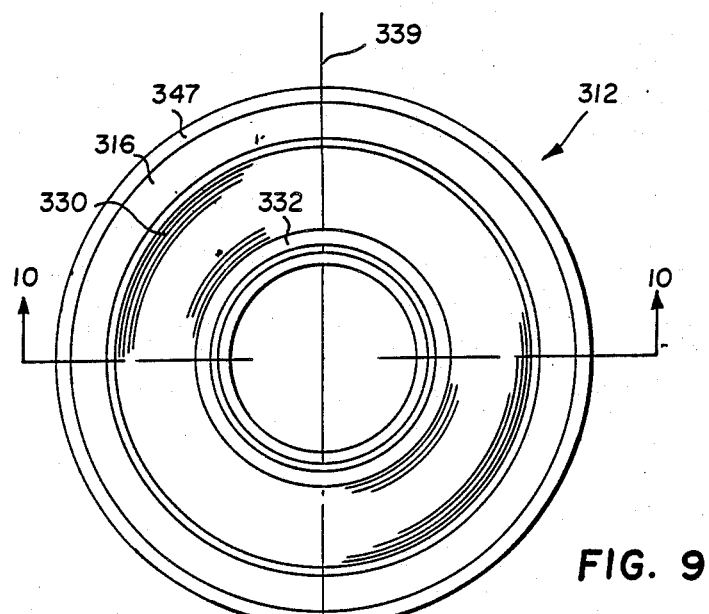
FIG. 9 shows a top plan view of an axial magnetic actuator constructed in accordance with the present invention.
Figure 10:
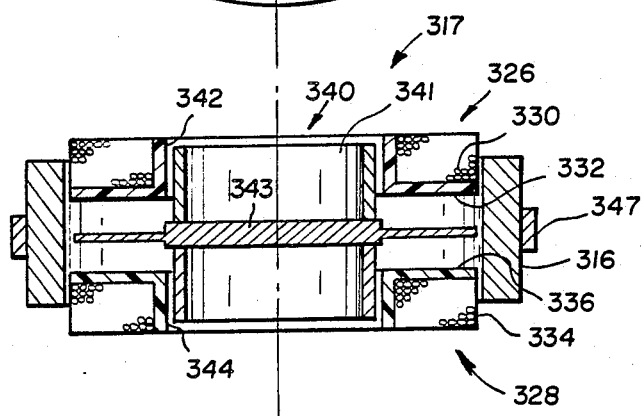
FIG. 10 is a sectional view, taken on line 10—10 in FIG. 9.
Figure 11:
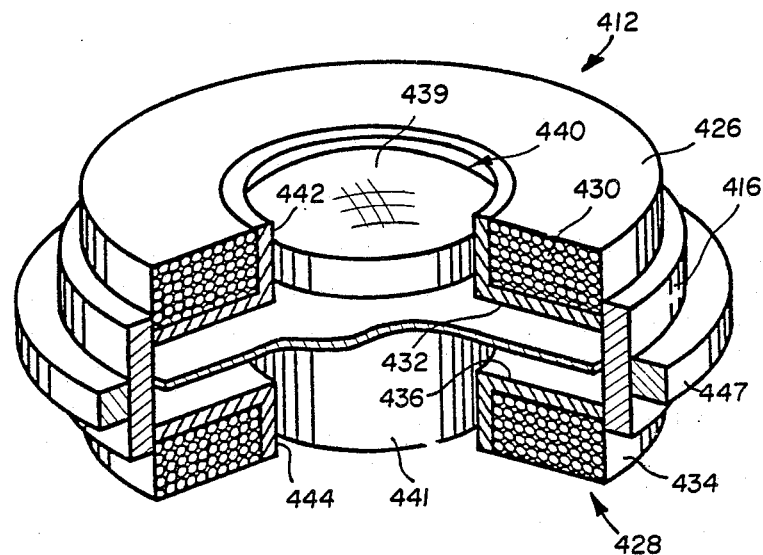
FIG. 11 is a perspective view showing an axial magnetic actuator in the form of a focus actuator.

An axial magnetic actuator 312 constructed in accordance with the present invention is shown in FIGS. 9 and 10. Actuator 312 comprises a member 340 which is movable along an axis 339. Electromagnets 326 and 328 are arranged along axis 339 at opposite ends of the path of travel of member 340. Electromagnet 326 comprises a bobbin 332 fixed to a stationary frame (not shown) and a coil 330 carried on the bobbin 332. Electromagnet 328 comprises a bobbin 336 fixed to a stationary frame (not shown) and a coil 334 carried on the bobbin 336. Bobbins 332 and 336 can be made, for example, from a synthetic resin polymer, sold under the trademark Teflon, or from nylon. An annular permanent magnet 316 is mounted around electromagnets 326 and 328, and magnet 316 is radially magnetized. Magnet 316 can be made from, for example, Ceramic 8, obtainable from Hitachi Magnets Corp.. Instead of using the annular permanent magnet 316, it is possible to use a plurality of permanent magnets (not shown) which are circumferentially spaced around the axis 339. A high permeability steel ring 347 is mounted around magnet 316. Member 340 includes a cylindrical element 341, which is movable on surfaces 342 and 344 of bobbins 332 and 336 respectively, and a soft iron washer 343.

Actuator 312 is monostable. When no current is supplied to coils 330 and 334, member 340 is maintained by magnet 316 in a rest position intermediate electromagnets 326 and 328 as shown in FIG. 10. The magnetic energy from magnet 316 is distributed along axis 339 in the manner shown in FIG. 6A for actuator 12. When a current of one polarity is supplied to coils 330 and 334, member 340 moves in one axial direction, and when a current of the opposite polarity is supplied to the coils 330 and 334, the member 340 moves in the opposite axial direction. Member 340 can move in either axial direction until washer 343 is adjacent one or the other of the electromagnets 326, 328. The amount of axial movement of member 340 is determined by the amount of current supplied to the electromagnets 326, 328. The amount of current can be regulated by a linear power amplifier (not shown) as described below for the embodiment shown in FIGS. 11 and 12.

A second embodiment of the present invention is shown an axial magnetic actuator 412 in the form of a focus actuator for use in, for example, a photographic camera, or in an optical disc recorder. Actuator 412 comprises a member 440 which is movable along an optical axis (not shown) to various axial positions. Member 440 comprises a lens 439 which is supported in a cylindrical lens mount 441. Surrounding the lens mount 441 is a soft iron washer 443. Electromagnets 426 and 428 are axially positioned at the two extremities of movement of member 440. Electromagnet 426 includes a coil 430 supported on a bobbin 432 formed of an insulating material such as Teflon or nylon, and electromagnet 428 includes a coil 434 which is supported on a bobbin 436 formed of the same insulating material as bobbin 432. An annular permanent magnet 416 encircles electromagnets 426 and 428, and the lines of force from permanent magnet 416 extend radially. A high permeability steel ring 447 is mounted around magnet 416 to provide a low reluctance path for the flux from magnet 416.

Figure 12:
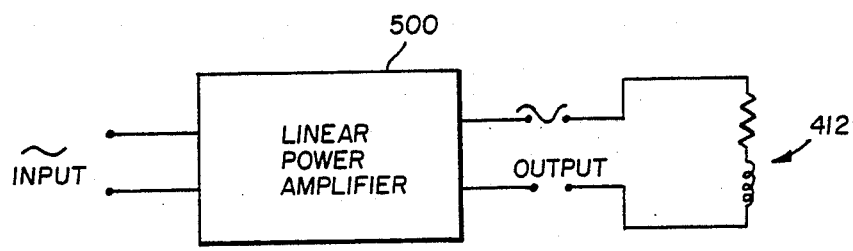
FIG. 12 is a schematic diagram of a driver for the actuator shown in FIG. 11.

Member 440 is maintained in a rest position midway between electromagnets 426 and 428 by magnet 416 when no current is supplied to the electromagnets 426, 428. When current of one polarity is supplied to coils 430 and 434, member 440 is moved in one axial direction, and when the polarity is reversed, the member 440 is moved in an opposite axial direction. As shown in FIG. 12, current can be supplied to actuator 412 through a linear power amplifier 500. The amount of axial movement of member 440 is controlled by the amount of current supplied to the coils 430 and 434. Actuator 412 could be used, for example, in a camera (not shown) in which it functions as part of an autofocus device (not shown). In such an application, the input to amplifier 500 would represent a desired setting of lens 439, and the output from amplifier 500 would correspond to the amount of current necessary to position the lens 439 at the desired setting. After a picture has been taken at the lens setting called for, the current to coils 430 and 434 would be stopped, and the member 440 would be returned to the rest position by permanent magnet 316.

Both actuator 312 and actuator 412 include an axially movable magnetic member suspended in the flux of a permanent magnet which is radially magnetized and electromagnets which create an axial flux which enhances the flux on one side of the movable magnetic member and bucks the flux on an opposite side thereof to effect movement of the member. Coils 330, 334, and coils 430, 434, have been disclosed herein as separate axially-spaced coils. However, the axial flux necessary to move the magnetic member could be provided by two coils (not shown) formed from a single conductor, or by a single coil (not shown). Further, coils 330, 334, and 430, 434, could be located on the outside of magnets 316 and 416 respectively, or a single large coil (not shown) could be located to surround the magnet 316 or magnet 416.

The invention has been described in detail with particular reference to a preferred embodiment thereof, but it will be understood that variations and modifications can be effected within the spirit and scope of the invention.

I claim:

1. An axial magnetic actuator for providing a driving force along an axis, said actuator comprising:
    a member movable along said axis between first and second locations, said member having at least a portion thereof formed of a magnetic material which provides a low reluctance path for magnetic flux;
    magnetic means disposed around said axis for forming a magnetic circuit adjacent said portion, said magnetic means maintaining said member in a rest position wherein said member is suspended in an axial direction between said locations, said magnetic means including an annular permanent magnet which is radially magnetized and is located between said locations; and
    means for creating an imbalance in said circuit to effect movement of said member, said means for creating an imbalance including a first electromagnet located at said first location and a second electromagnet located at said second location.

2. An axial magnetic actuator, as defined in claim 1, wherein said member is formed from silicon steel.

3. An axial magnetic actuator for positioning a lens along an optical axis, said actuator comprising:
    a member movable between first and second locations on said axis, said member including a lens and a lens mount, said lens mount having a portion formed of a magnetic material which provides a low reluctance path for magnetic flux;
    magnetic means disposed around said axis for forming a magnetic circuit adjacent said portion, said magnetic means including an annular permanent magnet which is radially magnetized and is located between said locations, said member being suspended in a rest position by said magnetic means; and
    means for creating an imblance in said circuit to effect movement of said member, said means for creating an imbalance including an electromagnet located at said first location and an electromagnet located at said second location.

* * * * *